Figure 1:
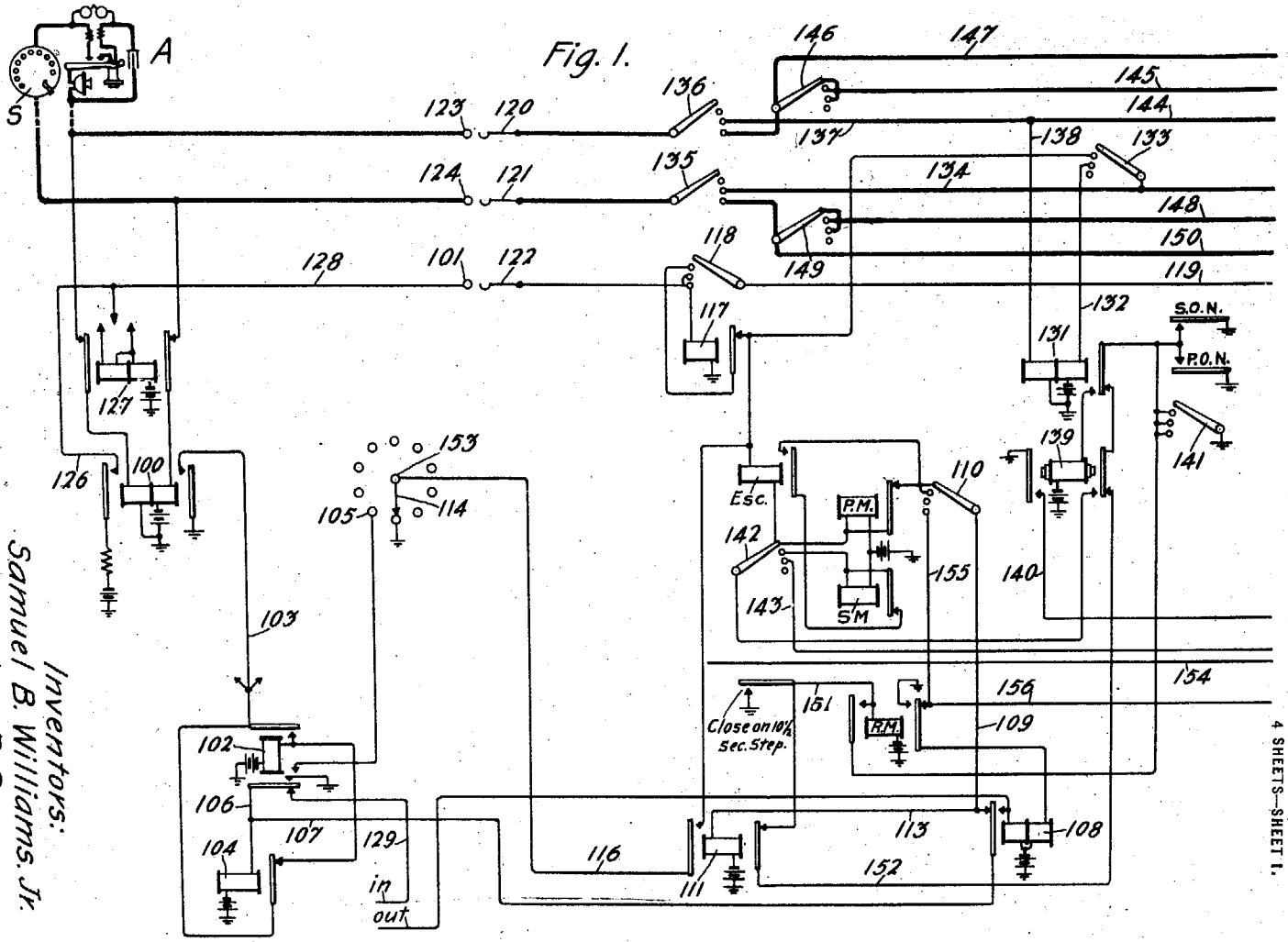

S. B. WILLIAMS, Jr., AND A. B. SPERRY.

MACHINE SWITCHING TELEPHONE EXCHANGE SYSTEM.

APPLICATION FILED MAR. 11, 1919.

Reissued Mar. 14, 1922.

15,310.

4 SHEETS—SHEET 1.

Inventors:
Samuel B. Williams. Jr.
Arthur B. Sperry.
by J. S. Roberts Atty.

S. B. WILLIAMS, JR., AND A. B. SPERRY.

MACHINE SWITCHING TELEPHONE EXCHANGE SYSTEM.

APPLICATION FILED MAR. 11, 1919.

Reissued Mar. 14, 1922. 15,310.

4 SHEETS—SHEET 2.

Inventors:
Samuel B. Williams Jr.
Arthur B. Sperry.
by J. E. Robertson Atty.

S. B. WILLIAMS, Jr., AND A. B. SPERRY.

MACHINE SWITCHING TELEPHONE EXCHANGE SYSTEM.

APPLICATION FILED MAR. 11, 1919.

Reissued Mar. 14, 1922.

15,310.

4 SHEETS—SHEET 3.

Inventors:
Samuel B. Williams Jr.
Arthur B. Sperry
by J. S. Roberts Att'y.

S. B. WILLIAMS, JR., AND A. B. SPERRY.

MACHINE SWITCHING TELEPHONE EXCHANGE SYSTEM.

APPLICATION FILED MAR. 11, 1919.

Reissued Mar. 14, 1922. 15,310.

4 SHEETS—SHEET 4.

Inventors:
Samuel B. Williams Jr.
Arthur B. Sperry.
by J. E. Roberts Atty.

UNITED STATES PATENT OFFICE.

SAMUEL B. WILLIAMS, JR., OF BROOKLYN, AND ARTHUR B. SPERRY, OF NEW YORK, N. Y., ASSIGNORS TO WESTERN ELECTRIC COMPANY, INCORPORATED, OF NEW YORK, N. Y., A CORPORATION OF NEW YORK.

MACHINE-SWITCHING TELEPHONE-EXCHANGE SYSTEM.

15,310. Specification of Reissued Letters Patent. Reissued Mar. 14, 1922.

Original No. 1,252,978, dated January 8, 1918, Serial No. 154,183, filed March 12, 1917. Application for reissue filed March 11, 1919. Serial No. 282,057.

(GRANTED UNDER THE PROVISIONS OF THE ACT OF MARCH 3, 1921, 41 STAT. L., 1313.)

*To all whom it may concern:*

Be it known that we, SAMUEL B. WILLIAMS, Jr., a citizen of the United States, residing at Brooklyn, in the county of Kings and State of New York, and ARTHUR B. SPERRY, a citizen of the United States, residing at New York, in the county of New York and State of New York, respectively, have invented certain new and useful Improvements in Machine-Switching Telephone-Exchange Systems, of which the following is a full, clear, concise, and exact description.

This invention relates to machine switching telephone exchanges of the type wherein a repeating relay at the central office is operated by a sender to transmit impulses to the stepping magnets to set the switches. It has been found in practice that the condensers, in the connecting circuit between the repeating relay and the switches, which serve to conductively separate the calling and called ends of the talking circuit, interfere, by their discharge, with the character of the impulses transmitted to the magnets of such relay.

One of the features of this invention is the provision of a circuit arrangement wherein the condensers are maintained disconnected from the outgoing conductors over which the impulses are transmitted until after all the switches are set, the response of the called party causing a circuit change to be brought about to connect the condensers in circuit with the called line to complete the talking circuit.

Another feature is the provision of a circuit arrangement wherein, when one of the selectors is set by the sender in operative relation to the desired trunk group, it will not hunt in such group if all the trunks thereof are busy, but will be automatically set in operative relation to another group of equivalent trunks which it will then automatically test in succession. This is brought about in the present embodiment by an auxiliary switch mounted on the brush shaft of the selector, and having a number of metallic segments and a brush, which, in the primary movement of the shaft, cooperates with such segments. One of these segments is provided for each trunk group which is likely to be overloaded. When all the trunks of the group to which the segment belongs are busy, a characteristic potential is automatically placed thereon. After the brush engages this segment at the termination of the primary movement, a circuit is closed to prevent the escape magnet from passing the selector side switch to the trunk hunting position, as it otherwise would do, and a relay is operated by the closure of this circuit to transmit an additional impulse to the primary magnet of the selector to set the same in operative relation to the equivalent trunk group. The circuit through the auxiliary switch is broken by this additional movement of the shaft, and deenergizes the escape magnet, which releases the side switch into the trunk hunting position to initiate the trunk hunting movement of the selector.

Another feature relates to the arrangement for feeding current to the connected lines, and is especially adapted for private branch exchanges employing automatic working. When a call is set up by one private branch subscriber with another in the same private branch exchange, current is fed to both lines from such exchange and when a private branch exchange subscriber sets up a connection with the main office with which the private branch exchange is associated, the bridge at the private branch exchange for feeding current to the calling lines is cut off and current is fed to such line from the main office.

Figure 2:
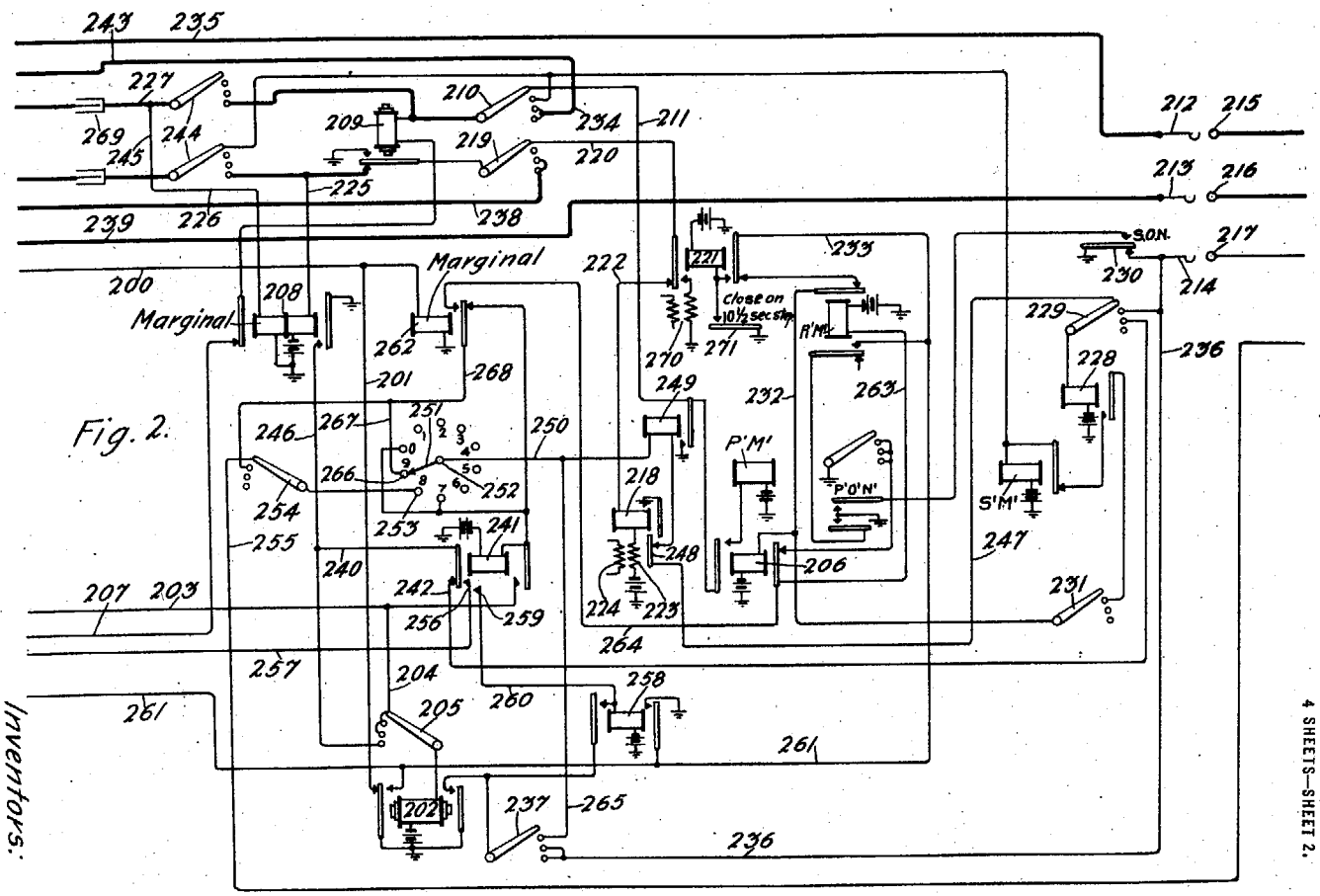
Figure 3:
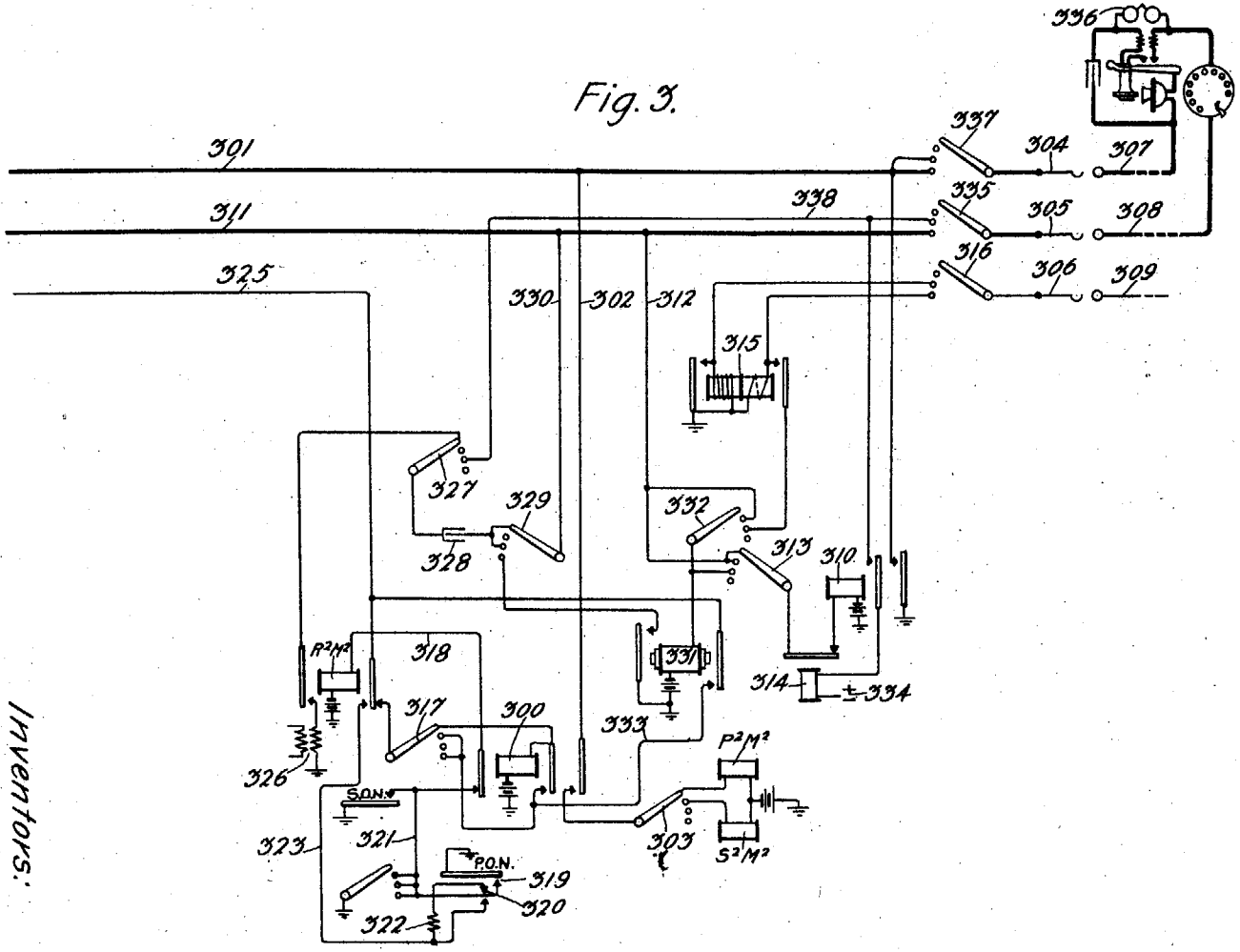
Figure 4:
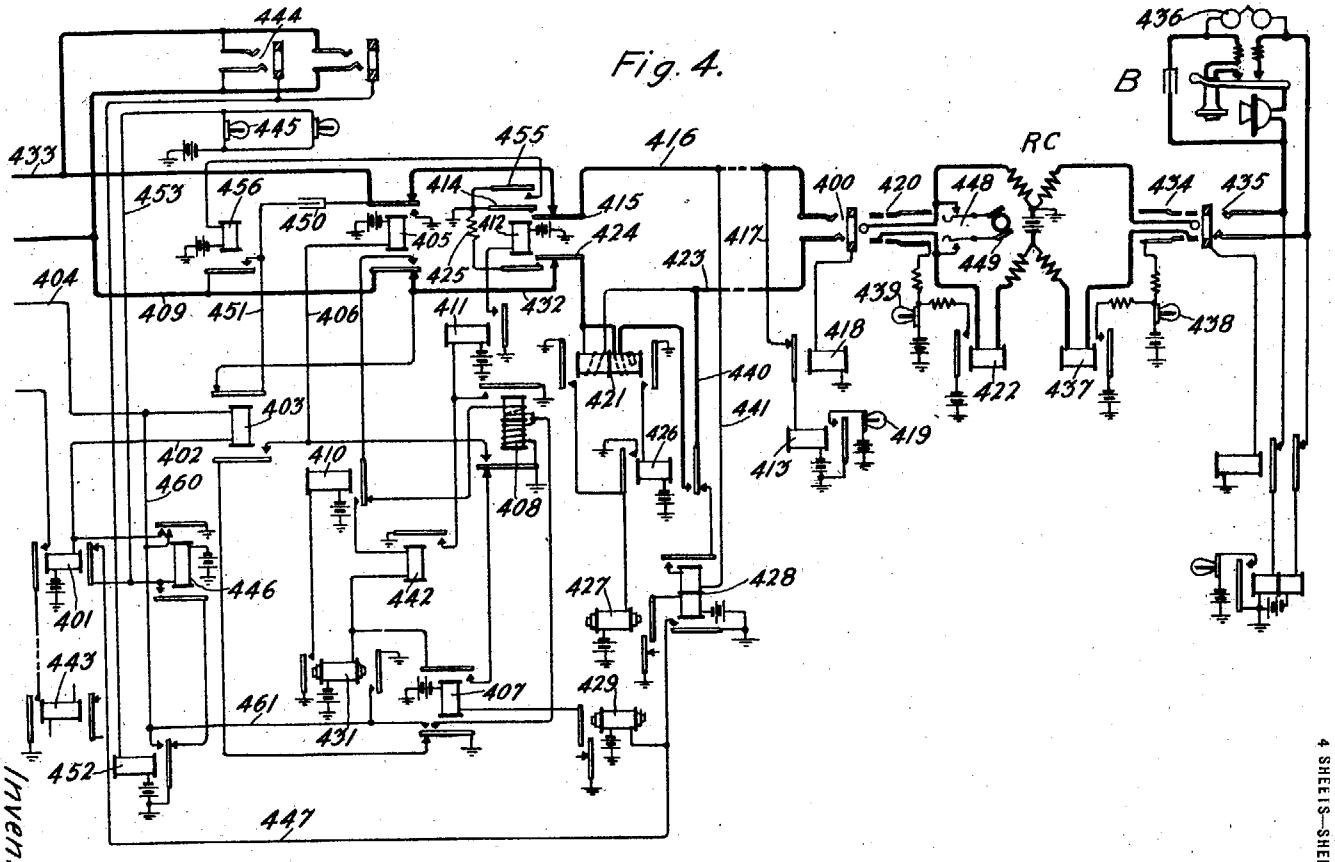

Figures 1, 2 and 3 when placed side by side, with the circuits therein joining, diagrammatically illustrate a path over which a connection may be established between two subscribers within the same office. Figures 1, 2 and 4 when placed side by side, with the circuits therein joining, diagrammatically illustrate a path over which a connection may be established between a subscriber in one office and a subscriber in another office.

The invention will be more readily understood from a detailed description of the operation.

Upon the removal of the receiver at substation A, line relay 100 is energized. In attracting its left armature it creates a calling condition upon the multiple 101 of substation A in the finders in which such line appears. In attracting its right armature, it energizes relay 102 to start a line finder in search of the calling line.

Relay 102, in attracting its upper armature, locks itself to conductor 103, independently of the right armature and back contact of relay 104, and in attracting its lower armature, applies ground to multiple segment 105 individual to the group of lines to which substation A belongs, and also closes the circuit of the primary magnet PM of the line finder as follows: ground, lower armature and front contact of relay 102, conductors 106, 107, armature and back contact of relay 108, conductor 109, side-switch arm 110 and its first contact, armature and back contact of magnet PM, magnet PM, free pole of battery. This magnet makes and breaks it own circuit, thus rotating the finder brush shaft 153. The attraction of the lower armature of relay 102 also closes a circuit for relay 111 in parallel with that traced for magnet PM: ground, lower armature and front contact of relay 102, conductors 106 and 107, armature and back contact of relay 108, conductor 113, relay 111, free pole of battery. Relay 111 connects the group brush 114 to the escape magnet ESC. At this time, however, the escape magnet does not operate since it is shunted over the path traced including the armature and back contact of magnet PM. Magnet PM energizes in the circuit traced and near the end of its stroke opens the shunt about the escape magnet, at which time the brush 114 is in contact with grounded group segment 105 and becomes energized over the following circuit: free pole of battery, magnet PM, magnet ESC, conductor 115, left armature and front contact of relay 111, conductor 116, brush 114, segment 105, to ground at the lower armature and front contact of relay 102. The escape magnet is constructed to release the side switch from position 1 to position 2 upon its energization. In position 2, the escape magnet is maintained energized over the following circuit: free pole of battery, magnet PM, magnet ESC, armature and back contact of relay 117, arm 118 and its second contact, conductor 119, conductor 200, 201, left armature and back contact of relay 202 to ground. In position 2, arm 110 closes the following circuit for magnet SM to step the positioned finder brushes 120, 121, 122 over the multiples 123, 124 and 101, of the group to which substation A belongs: free pole of battery, magnet SM, its armature and back contact, armature and front contact of magnet ESC, arm 110 and its second contact, conductor 109, to ground at the lower armature and front contact of relay 102. When the test brush 122 reaches the multiple 101 of substation A, the following circuit is closed to operate test relay 117 to stop the movement of the line finder: free pole of battery, resistance 125, left armature and front contact of relay 100, conductor 126, multiple 101, brush 122, relay 117 to ground. Relay 117 opens the circuit traced for magnet ESC which becomes deenergized, and in retracting its armature, opens the circuit of magnet SM to stop the finder on the calling line terminals. Magnet ESC, in deenergizing, releases the side SW into position 3. In position 3 arm 118 energizes the cut-off relay 127 over the following circuit: free pole of battery, right or both windings of relay 127, depending upon whether the substation A is a restricted or a non-restricted line, as will hereinafter more fully appear, conductor 128, contact 101, brush 122, arm 118 and its third contact, conductors 119, 200, 201, left armature and back contact of relay 202 to ground. Relay 127 in operating, deenergizes relay 100. The retraction of the left armature of relay 100 removes the calling condition from mutiples 101 of substation A, and the retraction of the right armature deenergizes relay 102. Relay 102, in retracting its lower armature, removes ground from starter wire 107 and restores the continuity of the in-starter wire 129, 107. Relay 117 is shunted and becomes inert due to the application of the direct ground to the brush 122, referred to. In position 3 the following circuit including the calling line is closed for the impulse relay 131: free pole of battery, right winding of relay 131, conductor 132, arm 133 and its third contact, conductor 134, arm 135 and its third contact, brush 121, terminal 124, through the telephonic apparatus at substation A, terminal 123, brush 120, arm 136 and its third contact, conductors 137, 138, left winding of relay 131, ground. Relay 131, in operating, energizes a slow relay 139. Relay 139, in attracting its right armature, interposes a break in the circuit of finder release magnet RM. In attracting its left armature, this relay closes the following circuit to energize a slow relay 202 (Fig. 2); ground, left armature and front contact of relay 139, conductors 140, 203, 204, first selector side-switch arm 205, relay 202, free pole of battery. Relay 202, in attracting its left armature, closes the following circuit for relay 206 which, in operating, connects the primary magnet P'M' to the back contact of the stepping relay 131. When the finder side switch moves into position 3, a distinctive tone is transmitted over the following circuit to the calling line to indicate to the calling party that the central office apparatus is ready to receive impulses; free pole of battery, secondary winding 223 of tone source 224, relay 218, conductor 222, left armature and back contact of relay 221, conductor 220, arm 219 and its first contact, lower armature and back contact of relay 209, conductor 225, right winding of relay 208, free pole of battery. This tone is transmitted by induction through the windings of relay 208 to the calling line over the following circuit: ground, left winding of relay 208, conductor 226, upper talking conductor 227, condenser 269, conductor 144, arm 136 and its third contact, brush 120, terminal 123, through the telephonic apparatus at substation A, terminal 124, brush 121, arm 135 and its third contact, conductor 134, arm 133 and its third contact, right winding of relay 131, free pole of battery.

The calling party now operates his sender S to transmit the first digit of the wanted number. In returning to normal, the sender interrupts the circuits traced a number of times, corresponding to the digit involved. Upon each retraction of the armature of relay 131, an impulse is transmitted over the following path: ground, finder primary off-normal contact PON, armature and back contact of relay 131, right armature and front contact of relay 139, arm 142 and its third contact, conductors 143, 207 (Fig. 2), left armature and back contact of relay 208, slow relay 209, arm 210 and its first contact, conductor 211, left armature and front contact of relay 206, magnet P′M′, free pole of battery. Magnet P′M′, in response to these impulses, steps the selector brushes 212, 213, 214 into operative relation with the desired group of trunks 215, 216, 217. Relay 209, being slow to release its armatures, is maintained energized during the transmission of the impulses. In attracting its lower armature, this relay closes the following circuit for a relay 218; ground, lower armature and front contact of relay 209, arm 219 and its first contact, conductor 220, left armature and back contact of relay 221, conductor 222, relay 218, free pole of battery. Relay 218, in operating, closes the following circuit for the escape magnet 228 of the first selector, which magnet is constructed to release the side switch from position to position upon its deenergization: free pole of battery, magnet 228, arm 229, conductor 247, spring 248 and armature of relay 218 to ground. When the sender S restores and maintains relay 131 energized, relay 209, after a slight interval, becomes deenergized, opening the circuit of relay 218, which, in deenergizing, opens the circuit of the escape magnet 228, which, in releasing its armature, passes the side switch to position 2 to initiate the trunk hunting operation. In position 2, escape magnet 228 is again energized over the following circuit: free pole of battery, magnet 228, arm 229 and its second contact, spring 230, now closed to its lower contact to ground. Magnet 228, in attracting its armature, closes a self-interrupting circuit for the secondary stepping magnet S′M′ of the first selector: free pole of battery, magnet S′M′, its armature and back contact, armature and front contact of magnet 228, arm 231, conductor 232, left armature and back contact of first selector release magnet R′M′, armature and back contact of relay 221, conductor 233, left armature and front contact of relay 202 to ground. Magnet S′M′ thus steps brushes 212, 213, 214, over the selected group in search of an idle trunk. Test multiples 217 of busy trunks are grounded, as will hereinafter appear. Upon the first secondary step of the brushes, contact 230 is opened and the escape magnet is dependent for its continued energization upon the grounded test terminals 217 of busy trunks. When the first idle trunk is reached, the ungrounded condition of its test multiple 217 causes the deenergization of the escape magnet, which opens the stepping circuit, thus stopping the selector upon such trunk, and in deenergizing passes the side switch to position 3.

In position 3 ground is supplied to the test multiplies 217 of the seized trunk over the following circuit: brush 214 conductor 236, arm 237 and its third contact, right armature and front contact of relay 202 to ground. The application of this ground energizes a relay 300 in the connector (Fig. 3), which, in attracting its outer right armature, connects primary magnet $P^2M^2$ of the connector to the upper talking conductor 301 to receive the tens impulses, and in attracting its left armature, interposes a break in the circuit of the connector release magnet $R^2M^2$. The calling party now operates his sender S to transmit the tens digit of the wanted number. Upon each retraction of the armature of the stepping relay 131, an impulse is transmitted over the following circuit to the primary stepping magnet $P^2M^2$ of the connector; armature of relay 131 now grounded, and its back contact, right armature and front contact of relay 139, arm 142 and its third contact, conductors 143, 207, left armature and back contact of relay 208, relay 209, arm 210 and its third contact, conductors 234, 243, 145, arm 146 and its third contact, conductors 147, 235, brush 212, terminal 215, conductors 301, 302, outer armature and front contact of relay 300, arm 303 and its first contact, magnet $P^2M^2$, free pole of battery. Magnet $P^2M^2$ thus steps the brushes 304, 305, 306 into operative relation with the group of terminals containing those of the wanted line 307, 308, 309. The slow relay 209 in the circuit traced for the primary magnet, became energized upon the first impulse, and remained energized during the transmission of the impulses. In attracting its lower armature, this relay closes the following circuit for the escape magnet 310 of the connector, which releases the connector side switch from position to position upon its deenergization: ground, lower armature and front contact of relay 209, arm 219 and its third contact, conductors 238, 148, arm 149 and its third contact, conductors 150, 239, brush 213, terminal 216, conductors 311, 312, arm 313, upper armature and back contact of relay 314, escape magnet 310, free pole of battery. When the sender restores and maintains impulse relay 131 energized, the slow relay 209, after a slight interval, becomes inert, opening the circuit traced for the escape magnet 310 which, in releasing its armatures, passes the connector side switch to position 2. In position 2, arm 303 substitutes the secondary magnet $S^2M^2$ for the primary magnet $P^2M^2$ in the stepping circuit. The calling party now operates his sender S to transmit the units digit of the wanted number. Upon each retraction of the armature of relay 131 an impulse is transmitted over the circuit traced to the side-switch arm 303, thence to the secondary magnet $S^2M^2$, free pole of battery, and as before the slow relay 209, in attracting its lower armature, energizes the connector escape magnet 310 over side switch arm 313 and now by way of its second contact and energizes the relay 331 over the side switch arm 332. The magnet $S^2M^2$ steps the brushes 304, 305, 306 into engagement with the multiples 307, 308, 309 of the desired line. At the end of this series of impulses the relay 209 becoming deenergized removes the ground from conductor 311 whereby the connector escape magnet 310 becomes deenergized to pass the side switch arms into position 3 and the slow-to-release relay 331 becomes deenergized if the called line is busy. Relay 331 being slow to release maintains a locking circuit for relay 300 for an instant after magnet 310 has become energized whereby time is allowed for the testing operation. If the line is busy its test terminal 309 will be grounded over a brush 306, arm 316 and its third contact, and the left grounded armature of the relay 315, or such arm and its fourth contact and the right-hand low-resistance winding of the relay 315 to ground. In such event the left-hand high-resistance winding of relay 315 of the testing connector is shunted and does not attract its armatures. In passing out of position 2 connector side-switch arm 317 opens the circuit of relay 300, and after a short interval the locking circuit for this relay through the right-hand armature of relay 331 is also opened. This relay thereupon becomes inert, and in retracting its left armature, closes the circuit of connector release magnet $R^2M^2$ as follows: free pole of battery, magnet $R^2M^2$, conductor 318, left armature and back contact of relay 300, primary off-normal contact 319 to ground. The release magnet in energizing restores the connector to its normal position and also restores the side switch. Before contact 319 opens, however, as the brush shaft is restored, contact 320 closes, which results in a locking circuit being provided for magnet $R^2M^2$ as follows: free pole of battery, magnet $R^2M^2$, left armature and back contact of relay 300, conductor 321, contact 320, resistance 322, conductor 323, right armature and front contact of magnet $R^2M^2$, release conductor 325, terminal 217, brush 214, conductor 236, arm 237 and its third contact, right armature and front contact of relay 202 to ground. Magnet $R^2M^2$, at its left armature and front contact, closes the following circuit to produce a busy tone in the calling line to indicate to the calling party that the line desired is occupied: ground, secondary winding of source of busy tone current 326, left armature and front contact of magnet $R^2M^2$, arm 327 and its first contact, condenser 328, arm 329 and its first contact, conductors 330, 311, terminal 216, brush 213, conductors 239, 150, arm 149 and its third contact, conductors 148, 238, arm 219 and its third contact, lower armature and back contact of relay 209, conductor 225, right winding of relay 208, free pole of battery. An induced current is created in the secondary winding of relay 208 included in the calling circuit. This circuit is the same as that traced for the dial tone. The calling party, upon hearing this busy tone, replaces his receiver. The replacement of the receiver deënergizes relay 131, which in retracting its armature, opens the circuit of slow relay 139. This relay after a slight interval releases its armatures. The retraction of the right armature closes the circuit of finder release magnet RM as follows: free pole of battery, magnet RM, conductor 151, right armature and back contact of relay 111, conductor 152, right armature and back contacts of relays 139, 131 contact PON to ground. The release magnet, in addition to restoring the finder brush shaft 153, also restores the side switch. The retraction of the left armature of relay 139 deenergizes relay 202. Relay 202, in retracting its left armature, opens the circuit of relay 206, which relay, in retracting its right armature, closes the circuit of first selector release magnet R′M′ as follows: free pole of battery, magnet R′M′, right armature and back contact of relay 206, contact P′O′N′ to ground. Magnet R′M′, in addition to restoring the selector brush shaft, also restores the side switch. When the shaft reaches its normal position, contact P′O′M′ opens and deënergizes the magnet R′M′. The retraction of the right armature of relay 202, removes ground from conductor 236 which results in the deënergization of connector release magnet $R^2M^2$. The apparatus is now all restored.

Assuming the selected line to be idle, full potential is present upon the multiple 309 thereof, and the test relay 315 becomes energized over its left-hand high resistance winding, in the third position of the side switch. This circuit is as follows: ground, left winding of relay 315, arm 316 and its third contact, brush 306, terminal 309, cut-off relay of the selected line, free pole of battery. Both the cut-off relay and the relay 315 become energized in the circuit, the former removing the control of the line relay from the selected line in the well-known manner and the latter connecting the test multiples 309 directly to ground over its left armature to cause the selected line to test busy to other connectors. The attraction of the right armature of relay 315 maintains a slow relay 331 emergized over the following circuit, this relay having been energized in position 2 over connector side-switch arm 332 in parallel with the escape magnet 310; free pole of battery, relay 331, arm 332 and its third contact, right armature and front contact of relay 315, right-hand low-resistance winding of relay 315 to ground. Relay 331 maintains closed a locking circuit for relay 300 as follows: free pole of battery, relay 300, its right armature and front contact, conductor 333, right armature and front contact of relay 331 to the grounded third wire 325. This is circuit closed before the circuit including the arm 317 and its second contact is opened, as the side switch passes out of position 2. Thus the relay 300 holds its left armature attracted to maintain the connector release circuit open. In parallel with the relay 331 the escape magnet 310 is energized to apply ringing current to the selected line. This circuit is as follows: free pole of generator 334, ringing cut-off relay 314, inner armature and front contact of magnet 310, arm 335 and its third contact, brush 305, terminal 308, bell 336, terminal 307, brush 304, arm 337 and its third contact, outer armature and front contact of relay 310 to ground. A portion of the ringing current flows over the following circuit to indicate by a characteristic tone to the calling party that the selected line is being signaled: free pole of generator 334, relay 314, inner armature and front contact of magnet 310, conductor 338, arm 327 and its third contact, condenser 328, arm 329 and its third contact, conductors 330, 311, terminal 216, brush 213, conductors 239, 150, arm 149 and its third contact, conductors 148, 238, arm 219 and its third contact, lower armature and back contact of relay 209, right-hand winding of relay 208, free pole of battery. This tone is transmitted by induction through the windings of relay 208 to the calling line as before described.

When the called party removes his receiver, marginal ringing cut-off relay 314 becomes energized, opening the circuit of escape magnet 310 which, in deënergizing, passes the side switch to position 4. In position 4 arm 316 connects the test multiples 309 to ground through the low-resistance right-hand winding of test relay 315 to maintain such line busy. Arm 332, in passing out of position 3, opens the circuit of slow relay 331. Before this relay retracts its right armature, however, arm 317 reaches position 4 and connects release relay 300 to the grounded third conductor 325 to prevent premature release. The arm 329 reaches its fourth contact before the right armature of relay 331 is retracted, which results in an impulse being transmitted over the following circuit to energize the called supervisory relay 208; ground, left armature and front contact of relay 331, arm 329 and its fourth contact, conductors 330, 311, terminal 216, brush 213, conductors 239, 150, arm 149 and its third contact, conductors 148, 238, arm 219 and its third contact, lower armature and back contact of relay 209, conductor 225, right winding of relay 208, free pole of battery. Relay 208, in attracting its right armature closes the following circuit for the first selector escape magnet 228: ground, right armature and front contact of said relay, conductors 246, 240, left armature and back contact of relay 241, conductor 242, arm 229 and its third contact, magnet 228, free pole of battery. When the impulse ceases and relay 208 retracts its right armature, the escape magnet, in releasing its armatures, passes the side switch to position 4, in which position the called supervisory relay 208 is energized over the called line circuit as follows: free pole of battery, right winding of relay 208, conductor 225, lower armature and back contact of relay 209, arm 219 and its fourth contact, conductors 238, 148, arm 149 and its third contact, conductors 150, 239, brush 213, terminal 216, conductor 311, arm 335 and its fourth contact, brush 305, terminal 308, through the telephonic apparatus at substation B, terminal 307, brush 304, arm 337 and its fourth contact, conductor 301, terminal 215, brush 212, conductors 235, 147, arm 146 and its third contact, conductors 145, 243, arm 210 and its fourth contact, arm 244, conductor 245, left winding of relay 208 to ground. Relay 208, in attracting its left armature, permanently interposes a break in the impulse circuit to prevent the calling party from thereafter transmitting impulses to the magnets, and in attracting its right armature, closes a substitute circuit for slow relay 202 as follows: ground, right armature and front contact of relay 208, conductor 246, arm 205 and its fourth contact, relay 202, free pole of battery. Since relay 202 controls the release of the first selector and connector as described, the release of these switches is now controlled by the called party. The parties may now converse, talking current being supplied to the calling line over the windings of relay 131 and to the called line over the windings of relay 208.

Upon the termination of the conversation and the replacement of the receiver by the calling party, the finder is released as already described. The replacement of the receiver by the called party deënergizes relay 208, which, in retracting its right armature, opens the circuit of relay 202. The retraction of the left armature of this relay deënergizes relay 206 as described in connection with a busy call, the deënergization of this relay causing the release of the first selector. The retraction of the right armature of relay 202 removes ground from the third wire 236, with the result that relay 300 becomes inert, and at its left armature and back contact closes the circuit of release magnet $R^2M^2$ of the connector as described in connection with a busy call.

Assuming now that the calling party desires to establish a connection with a line in a distant office. In that event the first selector brushes 212, 213, 214 are set under control of the sender S in operative relation to a group of trunks terminating in jacks 400 at the distant office (Fig. 4). The operations are the same as those traced up to the point where the selector brushes are set, except that a brush 251 (fixed to the selector shaft 252) at the end of the primary movement of the selector shaft rests in contact with a segment 8, instead of one of the segments 1 to 6 inclusive belonging to trunk groups terminating in connectors having access to local or lines in the private branch exchange. When the selector side switch passes to position 2 at the termination of the primary setting movement, a relay 241 is energized over the following circuit: free pole of battery, relay 241, armature and back contact of relay 262, arm 254 and its second contact, segment 8, brush 251, conductors 250, 265, arm 237 and its second contact to ground at the right armature and front contact of relay 202. Relay 241 in operating locks itself to grounded conductor 203. Upon the seizure of the trunk in the outgoing group selected, the following circuit is closed: free pole of battery, relay 401 (Fig. 4), conductor 402, relay 403, conductor 404, terminal 217, brush 214, conductor 236, arm 237 and its third contact, the right armature of relay 202 to ground. Relay 403, in attracting its upper armature, opens the bridge across the talking conductors including the condenser 450, and in attracting its lower armature, energizes relay 405 over the following circuit: free pole of battery, relay 405, conductor 406, lower armature and front contact of relay 403, lower armature and back contact of relay 407 to ground. Relay 405, in attracting its lower armature, connects both windings of relay 408 in series to the lower talking conductor 409 to which is connected the right winding of the called supervisory relay 208. This circuit is as follows: ground, windings of relay 408 in series, armature and back contact of relay 410, lower armature and front contact of relay 405, conductor 409, terminal 216, brush 213, conductors 239, 150, arm 149 and its third contact, conductor 148, conductor 238, arm 219 and its third contact, lower armature and back contact of relay 209, conductor 225, right winding of relay 208, free pole of battery. Relay 208 is marginal and does not attract its armatures in series with both windings of relay 408 when this circuit is closed, but the relay 408 is energized, and in attracting its upper armature, energizes the relay 411. Relay 411 in turn energizes relay 412 which, in attracting its armature 414, closes the following circuit to energize line relay 413 at the distant office: ground, armature 414 of relay 412, spring 415, conductor 416 leading to the distant office, conductor 417, outer armature and back contact of cut-off relay 418, left winding of relay 413, free pole of battery. Relay 413, in attracting its armature, lights lamp 419 to indicate to the operator the arrival of a call. The operator thereupon inserts her plug 420 into the jack 400 and since battery is connected to the ring of the plug and ground to the lower talking conductor at the lower armature and contact spring 424 of relay 412, relay 421 is operated over the following circuit: free pole of battery, answering-supervisory relay 422, ring of the plug, ring of the jack, conductor 423, left winding of relay 421, spring 424, lower armature of relay 412, resistance 425 to ground. The insertion of the plug energizes the cut-off relay 418 to deënergize the line relay 413, which, in retracting its armature, extinguishes lamp 419. Relay 421 becomes energized in the circuit traced, and in attracting its armatures, energizes relays 426 and 427. Relay 427, in operating, energizes relay 428, which in turn operates slow relay 429. Relay 429, in operating, energizes relay 407. Relay 407, in attracting its lower armature, grounds the third wire 404 leading back to the selector and shunts out high-resistance winding of relay 408, which results in the energization of the marginal called supervisory relay 208. Relay 208, in attracting its right armature, closes the following circuit for a relay 258; ground, right armature and front contact of relay 208, conductors 246, 240, left armature and springs 256, 259 of relay 241, conductor 260, relay 258, free pole of battery. Relay 258, in attracting its left armature, locks itself to the third wire 236, now grounded, as described, at the lower armature and front contact of relay 407. Relay 208, in attracting its right armature, also closes the following circuit for the escape magnet ESC of the finder: ground, right armature and front contact of the relay 208, conductors 245, 240, left armature and spring 256, conductors 257, 154, 115, magnet ESC, magnet PM, free pole of battery. The escape magnet is constructed to release the side switch from position 3 to position 4, upon its energization. As the arms 135 and 136 pass off their third contacts the calling supervisory relay 131 becomes inert, and after a slight interval, slow relay 139 releases its armatures. Release of the finder does not occur, however, since arm 110 in position 4 extends the conductor 261, now grounded at the right armature and front contact of relay 258 to the relay 111, and this relay becomes energized over the following circuit: free pole of battery, relay 111, conductors 113, 109, arm 110 and its fourth contact, conductors 155, 156, conductor 261 to ground at the right armature and front contact of relay 258. Relay 111 in attracting its right armature interposes a break in the circuit of finder release magnet PM, this break being introduced before the relay 139 retracts its right armature. The retraction of the left armature of relay 139 removes ground from conductor 203, thus deënergizing the slow relay 202, but before this takes place, the right armature of relay 258 has already applied a substitute ground to conductor 261, thus holding up the first selector release relay 206, which is maintaining a break in the circuit of release magnet R′M′ at its right armature and back contact.

The control of the release of the switches is now with the operator. When the operator plugged in and caused the energization of relay 407, as described, this relay, in addition to grounding the third wire leading back to the selector and shunting out the high-resistance winding of relay 408, opened the circuit of relay 405 which restored the continuity of the talking conductors. Upon the short-circuiting of the high-resistance winding of relay 408 and the resultant advancement of the finder side switch to the fourth position, the circuit for relay 408 became opened, and this relay, in retracting its upper armature deënergized relay 411, which in turn deenergized relay 412. This relay, in retracting its armatures, completed the talking circuit. Upon the retraction of armature 455 of relay 412, the circuit for a relay 456 is opened. This relay was energized upon the operation of relay 412. Relay 456 does not release its armature until after springs 424 and 415 have reached their back contacts. Thus the condenser 450 is bridged across the talking conductors 433 and 409 momentarily, to prevent the calling party from getting a disagreeable click in his ear. During conversation, relays 426, 427, 428, 429, 431 and 410 are energized. Relay 426, in attracting its right armature, closes a non-inductive shunt around the left winding of relay 421 to remove the impedance of this winding from the talking circuit. The operator by means of her head set (not shown) now communicates with the calling party at substation A, talking current being supplied from the main office over the following path: free pole of battery, lower left-hand winding of repeating coil RC, relay 422, ring of the plug, ring of the jack, conductor 423, right armature and front contact of relay 426, right-hand non-inductive winding of relay 421, spring 424 of relay 412, conductor 432, lower armature and back contact of relay 405, conductor 409, terminal 216, brush 213, conductors 239, 150, arm 135 and its fourth contact, brush 121, terminal 124, through the telephonic apparatus at substation A, terminal 123, brush 120, arm 136 and its fourth contact, conductors 147, 235, brush 212, terminal 215, conductor 433, upper armature and back contact of relay 405, spring 415 of relay 412 and its back contact, conductor 416, tip of the jack, tip of the plug, upper left-hand winding of the repeating coil RC to ground.

Having ascertained the wanted number, the operator inserts the plug 434 into jack 435 of the desired line, and rings the bell 436 at substation B thereof by means of her ringing key, not shown. Upon the response of the called party, the calling supervisory relay 437 operates and shunts out the calling supervisory lamp 438 to indicate such response to the operator. As this part of the circuit is well-known, it will not be described in detail.

The replacement of the receivers by the parties results in the deenergization of the supervisory relays 422, 437, and the illumination of lamps 439 and 438. The replacement of the receiver by the party at substation A, deenergizes relay 421, which in turn deenergizes relay 426. Before this relay has retracted its left armature long enough to deenergize slow relay 427, the right armature of such relay has reached its back contact, thus closing the following locking circuit for relay 428: free pole of battery, lower left-hand winding of repeating coil RC, relay 422, ring of the jack, ring of the plug, conductors 423, 440, right-hand armature and back contact of relay 426, upper armature and front contact of relay 428, upper winding of said relay, conductors 441, 416, tip of the jack, tip of the plug, upper left-hand winding of repeating coil RC to ground. This relay is thus maintained energized after the retraction of the armature of relay 427, and at its lower armature and front contact maintains relay 429 energized, which in turn holds relay 407 energized, which relay, in maintaining its lower armature attracted, holds ground on the third wire 404 leading back to the selector and finder to prevent their release. In response to the illumination of lamp 439, the operator withdraws plug 420 from jack 400, thus deenergizing relay 428, which, in retracting its lower armature, deenergizes relay 429 which, in turn, in deenergizing, renders relay 407 inert. The retraction of the lower armature of this relay removes ground from the third wire leading back to the preceding switches, thus deenergizing relay 258. Relay 258, in retracting its right armature, removes ground from conductor 261, whereupon relay 206 becomes deenergized, closing the circuit of selector release magnet R′M′ as already described. The removal of ground from conductor 261 also deenergizes relay 111 of the finder, which closes the circuit of finder release magnet RM hereinbefore traced. All the apparatus is now restored.

If the operator removes the plug 420 from jack 400 before the calling party restores his receiver, the connection is not broken down, but instead, the calling lamp 419 is again lighted. The removal of the plug deenergizes relay 421, which causes the release of relay 407. Relay 407, when energized as the plug was inserted, prepared, at its upper armature and front contact, a circuit for a slow relay 431, which was closed when relay 408 released its lower armature as the finder side switch moved out of its third position. Relay 431, in attracting its right armature, applied an additional ground to the third wire 404 leading back to the preceding switches, and at its left armature, energized relay 410 to connect relay 431 to the front contact of the relay 405. When relay 407 releases as the plug is withdrawn, its lower armature reaches its back contact and energizes relay 405 before the relay 431 has time to retract its right armature, its circuit being opened at the upper armature of relay 407. Relay 405, in operating, bridges this slow relay 431 across the calling line, and due to the closed condition of the substation circuit at this time, becomes energized over the following circuit: free pole of battery, relay 431, relay 442, armature and front contact of relay 410, lower armature and front contact of relay 405, conductor 409, over the circuit previously traced including the telephonic apparatus at substantion A, returning over conductor 433, upper armature and front contact of relay 405, to ground. The relay 442 energizes relay 411, which in turn energizes relay 412. Relay 412 again closes the circuit traced for the left winding of relay 413, which, in operating, again illuminates the lamp 419. This indicates to the operator that the calling party desires attention.

Referring now to Figs. 2 and 4, each of the trunks 215, 216 and 217 of the group leading to the main office to which group segment 8 belongs, is provided with a relay 401 (Fig. 4). When a trunk of this group is seized, the relay 401 thereof becomes energized as described. If, at the termination of the hundreds set of impulses, that is, when the selector is set in operative relation to this group, all the trunks thereof are busy, a circuit will be closed, including the armature and front contacts of all the relays 401, 443, etc., in series, to maintain the escape magnet 228 of the first selector in its first position, and to cause an additional impulse to be delivered to the first selector primary magnet P′M′, which will step the brushes 212, 213, 214 into operative relation to an equivalent trunk group; that is to say, to another group of trunks terminating in the same main office. The circuit for the escape magnet is as follows: free pole of battery, magnet 228, arm 229 and its first contact, conductor 247, make-before-break contact 248 of relay 218, relay 249, conductor 250, brush 251 on the selector brush shaft 252, segment 253, arm 254, conductor 255, through the left armatures and front contacts of relays 401, 443, etc., in series of the selected group to ground. The closure of this circuit, in addition to maintaining the escape magnet energized after the armature of relay 218 is retracted as the impulses cease, also energizes relay 249 which, in attracting its armature, transmits an additional impulse to magnet P′M′ of the first selector. The brush 251 is thus stepped off the segment 253, opening the circuit traced for magnet 228 and relay 249. Magnet 228 thereupon releases its armature, passing the side switch to position 2 or the trunk hunting position. The trunk hunting operation then ensues as hereinbefore described.

If all the trunks of the auxiliary group are busy, relay 221 will be energized to apply a busy tone to the calling line when the selector leaves the last trunk terminal, due to the closure of contact 271, this contact being closed by the selector shaft when it takes ten and one-half steps. In attracting its right armature this relay opens the circuit of release relay 206, which in deenergizing closes the circuit of release magnet R′M′. Magnet R′M′ in operating restores the side switch, and arm 219 thereof connects the lower talking conductor to the front contact of the left armature of relay 221 to which a busy tone source 270 is connected. When relay 221 operated it locked itself to conductor 233, and since this conductor is grounded at the left armature and front contact of relay 202, busy tone is maintained applied to the calling line until the receiver is replaced, whereupon release takes place as described in connection with a busy call. This relay is operated upon the tenth and a half-secondary step, while hunting in any group.

In the present embodiment of the invention, segments 1 to 6 inclusive are apportioned to trunk groups local to the private branch exchange as stated, terminating in automatic switches, as shown in Fig. 3. Segments 8 and 9 are apportioned to the trunk groups leading to the main office to which this private branch exchange belongs. Segments 7 and 0 may be apportioned to trunk groups terminating at other manual offices. It will be noted that when the selector is set on the trunk groups to which these segments are apportioned, the relay 241 is operated to prepare circuits for cutting off the local bridge and feed current to the calling line from the operator's cord circuit, as described. One of these trunk groups may lead to operators' positions in the private branch exchange and the other to outside private branch exchanges.

It is desirable in private branch exchange working to restrict some of the subscribers to local service, and the circuit arrangement of this invention is such that when such a subscriber attempts to set up a call to a distant office, the selector switches are automotically released when set by such a subscriber in operative relation to the trunk group leading to such office. The cut-off relays of the restricted lines have a lower resistance than those of the non-restricted lines, and when, upon the removal of the receiver, one of the restricted lines has become extended to a first selector (Fig. 2) the marginal relay 262 thereat becomes energized and prepares the circuit of the release magnet of the first selector. The circuit for the relay 262 is as follows: free pole of battery, right-hand winding of relay 127, conductor 128, terminal 101, brush 122, arm 118 and its third contact, conductors 119, 200, relay 262 to ground. This path leading through the right-hand winding of relay 127 is of such resistance that the current flowing therethrough and in series through relay 262 is sufficient to energize the latter. When the slow relay 209 releases its armature, upon the termination of the first set of impulses, and the side switch moves into position 2, the grounded right-hand armature of relay 202 is extended over first selector side-switch arm 237, conductors 265, 250, brush 251, segment 253, with with it is now in contact, arm 254, and its second contact, armature and front contact of relay 262, conductors 264, 263, release magnet R′M′, free pole of battery. The first selector is thus released when a restricted subscriber attempts to set up a prohibited connection. If the calling party sets the selector brushes in operative relation to the extra trunk group to which segment 9 belongs, the circuit of the release magnet is closed as described except that it leads from brush 251 to conductor 267 and thence to the front contact of relay 262.

The jack 444 is provided for use in toll calls. A party in the private branch exchange, having called the operator at the main office (Fig. 4), as described, and after having informed her of the toll connection desired, hangs up his receiver. The operator then withdraws the plug 420 from the jack 400, and the connection is broken down. When the toll connection is set up, the operator inserts the plug 420 into the jack 400 to light lamp 445 before an operator at the private branch exchange. This is accomplished as follows: The operator inserts the plug and operates her ringing key 448, to close a circuit to energize relay 421 as follows: ringing generator 449, key 448, tip of the plug, tip of the jack, conductor 416, spring 415 of relay 412 and its back contact, upper armature and back contact of relay 405, condenser 450, conductor 451, upper armature and back contact of relay 403, conductor 432, spring 424 of relay 412, left winding of relay 421, conductor 423, ring of the jack, ring of the plug, key 448, ringing generator 449. Relay 421, in operating, energizes relay 426 which in turn energizes relay 427. Relay 427 in operating energizes relay 428. Relay 428 attracts its upper armature. When the key is released relay 426 retracts its right armature before relay 427 retracts its armature, and consequently the relay 428 is locked over the circuit previously described, including the operator's cord circuit. Relay 428, in attracting its lower armature, energizes relay 446 over the following circuit: lower grounded armature of relay 428, conductor 447, right armature and back contact of relay 401, relay 446, free pole of battery. Relay 446 locks itself to ground at the armature and back contact of relay 452, and lamp 445 is lighted over the following circuit: free pole of battery, lamp 445, conductor 453, lower armature and front contact of relay 446, armature and back contact of relay 452 to ground. Relay 446 in attracting its upper armature, operates relay 401 and grounds the third conductor 404 leading back to the selector (Fig. 2) to render this trunk busy. Relay 403 is shunted at this time and remains inert. The operator at the private branch exchange now inserts a plug into the jack 444. The insertion of the plug operates relay 452, which, in attracting its armature, unlocks relay 446.

Relay 446 in retracting its upper armature removes the shunt from about relay 403 and this relay becomes energized over the following circuit: free pole of battery, relay 401, conductor 402, relay 403, conductors 460, 461 to ground at the armature and front contact of relay 431. Relay 403 in attracting its upper armature removes the bridge containing condenser 450 from across the talking circuit. The private branch exchange operator now bridges her head set (not shown) across the talking conductors 433, 409 and learns the number of the wanted line. She then inserts the other plug into the jack of such line, and by means of her ringing key (not shown) signals such party. Upon his response, he is informed that the toll connection is now set up. When the calling party restores his receiver, the operator at the private branch exchange pulls out the plug from the jack 444, which, in deënergizing relay 422, lights the lamp 439 at the main office, whereupon the operator pulls out the plug 420 from jack 400 and the plug 434 from the toll jack.

While the retraction of the upper armature of relay 446 removed ground from the third wire 404 the attraction of the armature of relay 452 reapplied the same to maintain ground on the multiples 217 to cause the trunk to test busy as long as the plug at the private branch exchange remains in the jack. The trunk is also maintained busy as long as the plug 420 remains in jack 400 at the main office, since the relay 431 is during such period energized and at its right armature applies ground to the third wire 404.

What is claimed is:

1. In a telephone exchange system, the combination with telephone lines, senders therefor, a connecting circuit including automatic switches, and a repeating relay in said circuit operated by said senders to set said switches, of condensers in said connecting circuit between said relay and switches, normally disconnected from the called end of the connecting circuit, and means automatically actuated upon the response of the called party for connecting said condensers in circuit with the called line.

2. In a telephone exchange system, the combination with telephone lines, senders therefor, a connecting circuit including automatic switches, a repeating relay in said circuit operated by said senders to set said switches, and condensers in said connecting circuit between said relay and switches, of a side switch normally disconnecting said condensers from the called end of said connecting circuit, and means operated by the response of the called party for advancing said side switch to connect said condensers in circuit with the called line.

3. In a telephone exchange system, the combination with telephone lines, senders therefor, a connecting circuit including automatic switches, a repeating relay in said circuit operated by said senders to set said switches, and condensers in said connecting circuit between said relay and switches, of a side switch normally disconnecting said condensers from the called end of said connecting circuit, a circuit for the escape magnet of said side switch whereby the side switch is advanced to connect said condensers in circuit with the called line, a control relay for closing the same, a side switch associated with the last of the train of automatic switches having a ringing and a talking position, means, for advancing said side switch to the ringing position operated if the selected line is idle, a slow release relay, a circuit therefor closed in the ringing position, means operated by the response of the called party for advancing said switch to the talking position in which the circuit for said slow relay is opened and a circuit including a front contact of said slow relay and an arm of said connector side switch in its fourth position and said control relay to operate the same.

4. In a telephone exchange system, the combination with telephone lines, senders therefor, a connecting circuit including automatic switches, a repeating relay in said circuit operated by said senders to set said switches, and condensers in said connecting circuit between said relay and switches, of an electromagnetic switch normally disconnecting said condensers, from the called end of the connecting circuit, means operated by the response of the called party for actuating said switch to interconnect the calling and called ends through said condensers, inductive means connected on both sides of the open contacts of said electromagnetic switch, and means actuated by the busy condition of the selected line for rendering said inductive means effective to transmit a busy tone to the calling line.

5. In a telephone exchange system, the combination with telephone lines, senders therefor, a connecting circuit including automatic switches, a repeating relay in said circuit operated by said senders to set said switches, and condensers in said conductors between said relay and switches, of a side switch normally disconnecting at a pair of its arms said condensers from the called end. means operated by the response of the called party for advancing said side switch to interconnect the calling and called ends through said condensers, inductive means connected on both sides of said side switch-arms, a source of busy-tone current, and means actuated by the busy condition of the selected line for transmitting a tone from said source around said side-switch arms to the calling line.

6. In a telephone exchange system, the combination with telephone lines, senders therefor, a connecting circuit including automatic switches, a repeating relay in said circuit operated by said senders to set said switches, and condensers in said conductors between said relay and switches, a called supervisory relay having a winding connected on each side of said side-switch arms, means operated by the response of the called party for advancing said side switch to inter-connect the calling and called ends of the connecting circuit through said condensers and for connecting said relay in circuit with the called line, a source of busy-tone current, and means actuated by the busy condition of the selected line for transmitting a tone from said source around said side-switch arms to the calling line by induction through the windings of said relay.

7. In a telephone exchange system, the combination with telephone lines, a repeating relay set, condensers and a selector, a side switch adapted in one position to feed current to the calling line through the windings of one of said relays, and in another to cut off said relay and condensers and extend the calling line directly to the selector brushes, groups of trunks terminating in said selector, means for setting up a connection between said lines including one of said trunks, and means controlled by the selection of a predetermined trunk group for causing said side switch to cut off said relay and condensers, and feed current to the calling line over the seized trunk.

8. In a telephone exchange system, the combination with a telephone line, a connecting circuit including a battery feed coil, condensers and a selector, groups of trunks terminating in said selector, groups of automatic switches, groups of manual switches, some of said trunk groups terminating in said automatic switches and some in said manual switches, means for setting said selector upon an idle trunk in any group, signals associated with said manual switches, means operated upon the actuation of a manual switch in response to the signal thereof for excluding said feed coil and condensers, and means for feeding current to the calling line over said manual switch.

9. In a telephone exchange system, the combination with a plurality of offices, telephone lines terminating therein, a connecting circuit at one of said offices including a battery feed coil, condenser, and a selector, a side switch adapted in one position to feed current to the calling line through the windings of said feed coil and in another to cut off said coil and condensers and extend the calling lines directly to the selector brushes, groups of trunks terminating in said selector, means including said selector for setting up a connection including two lines in the same office, and means for causing said selector to pick out a trunk leading to the distant office, a circuit for advancing said side switch to cut off said condensers, a relay adapted to be operated to prepare said circuit when a trunk to the distant office is selected, and means operated when said connection is established with the distant office for closing said circuit.

10. In a telephone exchange system, the combination with a plurality of offices, telephone lines terminating therein, a connecting circuit at one of said offices including a battery feed coil, condenser, and a selector, a side switch adapted in one position to feed current to the calling line through the windings for said feed coil and in another to cut off said coil and condensers and extend the calling lines directly to the selector brushes, groups of trunks terminating in said selector, means including said selector for setting up a connection including two lines in the same office, and means for causing said selector to pick out a trunk leading to the distant office, a circuit for advancing said side switch to cut off said condenser, a relay, means including an auxiliary switch on the selector for operating said relay to prepare said circuit when a trunk to the distant office is selected, a second relay for closing said circuit, and a circuit for said second relay closed when the connection is established with the distant office for operating said second relay.

11. In a telephone exchange system, the combination with an automatic office, a manual office, telephone lines terminating therein, a connecting circuit including a feed coil, condensers, and a selector in said automatic office, means including said selector for setting up a connection in said automatic office for causing said selector to pick out a trunk leading to the manual office, a signal thereat operated upon the seizure of an idle trunk, a side switch adapted in one position to feed current to the calling line through the windings of said feed coil and in another to cut off said coil and condensers and extend the calling line directly to the selector brushes, and manual means associated with the seized trunk at the manual office and actuated in response to said signal for causing said side switch to cut off said coil and condensers, and feed current to the calling line over the seized trunk.

12. In a telephone exchange system, the combination with an automatic office, a manual office, telephone lines terminating therein, a connecting circuit including an impulse relay, condensers, and a selector in said automatic office, trunks terminating therein leading to said manual office, means including said impulse relay and selector for setting up a connection in said automatic office or causing said selector to pick out one of said trunks leading to the manual office, a side switch adapted in one position to feed current to the calling line through the windings of said impulse relay and in another to cut off said coil and condensers and extend the calling line directly to the selector brushes, a circuit for advancing said side switch to cut off said condensers, a relay adapted to be operated to prepare said circuit when said trunk is selected, and means controlled by the operator at the manual office for closing said circuit and for feeding current to the calling line over the seized trunk.

13. In automatic and semi-automatic telephone systems, the combination of subscribers' lines, battery feeding devices, discriminating means adapted in one condition to connect battery feeding devices to the lines of calling and called subscribers, and to place the control of the release of the connection with the calling subscriber, and in another condition to cut off such devices from a calling line, and to place the control with an operator, and means for altering the condition of such discriminating means.

14. In automatic and semi-automatic telephone systems, the combination of subscribers' lines, battery feeding devices, discriminating means adapted in one condition to connect battery feeding devices to the lines of calling and called subscribers, and to place the control of the release of the connection with the calling subscriber, and in another condition to cut off said device from a calling line, and to place the control with an operator, means for altering the condition of such discriminating means, a third conductor circuit and a relay in said circuit adapted on the circuit being extended to an operator to maintain the partially complete connection against release.

15. In automatic and semi-automatic telephone systems, the combination of subscribers' lines, battery feeding devices, discriminating means adapted in one condition to connect a battery feeding device to the lines of calling and called subscribers, and in another condition to cut off said devices from said lines, means for altering the condition of such discriminating means, a third conductor circuit and a relay in said circuit adapted on an abnormal interruption of a completed connection to deenergize and to give a busy signal to the calling subscriber.

16. In automatic and semi-automatic telephone systems, the combination of subscribers' lines, pre-selector switches, digit selector switches, battery feeding devices, discriminating means located between a pre-selector switch and a first digit selector switch and comprising means adapted to be operated upon the completion of a connection and means adapted to be operated by a subscriber for effecting different circuit changes according as the connection is for a subscriber or for an operator.

17. In automatic and semi-automatic telephone systems, the combination of subscribers' lines, battery feeding devices, a pre-selector, a digit selector, a trunk connecting such selectors, a manual switchboard, a trunk leading from the digit selector to the switchboard, a relay connected to one line branch of the first trunk and adapted to be inoperative during the transmission of selecting impulses and to be operated when a calling subscriber has been connected to another subscriber or to the switchboard, means for operating such relay from the called end of the connection, and means for disconnecting such relay from the connection.

18. In automatic and semi-automatic telephone systems, the combination of subscribers' lines, pre-selector switches, digit selector switches, a trunk connecting the switches, a device connected to the trunk and adapted to feed current to a calling subscriber, condensers connected in said trunk, a relay having two windings, each of which is connected to one line branch of said trunk, adapted to feed current to the called end of the connection, and means for completing a loop through said windings when the trunk is extended to a called subscriber.

19. In automatic and semi-automatic telephone systems, the combination of subscribers' lines, a device adapted to feed current to a calling subscriber, a trunk, a relay having two windings, each of which is connected to one line branch of said trunk, and means for energizing one of these relay windings from the called end of said trunk before the completion of the connection.

20. In automatic and semi-automatic telephone systems, the combination of subscribers' lines, a trunk, a device connected to the trunk and adapted to feed current to a calling subscriber, condensers connected in said trunk, a manual switchboard, a relay having two windings, each of which is connected to one line branch of said trunk, means for connecting the trunk to the switchboard, means for energizing one of said relay windings before the other when the trunk has been connected to the switchboard, and means for removing said current feeding device, relay windings and condensers from the trunk.

In witness whereof, we hereunto subscribe our names this 22nd day of December, 1921.

SAMUEL B. WILLIAMS, Jr.
ARTHUR B. SPERRY.